United States Patent [19]
Cason

[11] Patent Number: 5,967,366
[45] Date of Patent: Oct. 19, 1999

[54] COIN-OPERATED FLUID VENDING MACHINE

[76] Inventor: Albert Franklin Cason, 1929 Nolina Rd., Knoxville, Tenn. 37922

[21] Appl. No.: 09/086,214

[22] Filed: May 28, 1998

[51] Int. Cl.[6] ...................................................... G01F 11/28
[52] U.S. Cl. .............................. 222/2; 222/447; 222/448; 222/449
[58] Field of Search ................................ 222/2, 442, 444, 222/445, 446, 447, 448, 449, 450

[56] References Cited

U.S. PATENT DOCUMENTS

| 2,792,920 | 5/1957 | Suphen et al. . |
| 5,425,404 | 6/1995 | Dyer . |
| 5,560,405 | 10/1996 | Harris et al. . |

*Primary Examiner*—Philippe Dergkshani
*Attorney, Agent, or Firm*—Pitts & Brttian, P.C.

[57] ABSTRACT

A windshield cleaning fluid dispenser 10 that is coin-operated. The windshield cleaning fluid dispenser 10 of the present includes a primary reservoir 15 in which the windshield cleaning fluid 18 is stored pending dispensing. A measuring reservoir 20 is in fluid communication with the primary reservoir 15. A dispensing tube 25 is in fluid communication with the measuring reservoir 20. The flow of windshield cleaning fluid 18 between the primary reservoir 15 and the measuring reservoir 20 is controlled by a pair of crank 60 actuated poppet valves 30 and 40. Springs 35 and 45 are provided to bias the poppet valves into the closed position. Crank 60 has a substantially cylindrical cross section and a pair of tethers 76 and 78 are secured to the crank 60 at a selected point 80 on its circumference. The distal end 81 of the first tether 76 is secured to the first poppet valve 30 and the distal end 82 of the second tether 78 is secured to the second poppet valve 40. The crank 60 is movable in a first selected direction from a starting position to an actuation position. Movement in the opposite direction returns the crank to the starting position. Both poppet valves 30 and 40 are closed when the crank 60 is midway between the starting and actuation positions. Thus, the primary reservoir 15 is at all times isolated from the dispensing tube 25.

13 Claims, 9 Drawing Sheets

COIN-OPERATED FLUID VENDING MACHINE

TECHNICAL FIELD

This invention relates to the field of coin operated vending machines. More particularly, it relates to a coin operated fluid vending machine for dispensing a selected volume of windshield cleaning fluid.

BACKGROUND ART

Windshield cleaning fluid is a convenient means of maintaining the visibility through the windshield at a level necessary for the safe operation of an automobile. Typically, windshield cleaning fluid is sold at gas stations, convenience markets, automotive supply stores and discount stores. And, typically, is sold in disposable one-gallon plastic jugs. Windshield cleaning fluid can also be sold as a concentrate to be mixed with the appropriate amount of water by the end user. This results in increased costs in terms of packaging and shipping. In addition, the consumer is faced with the problems associated with handling, storing and disposing of the plastic jug, and the jugs, when empty, contribute to the solid waste stream. Additionally, unused fluid remaining in discarded jugs is a potential environmental contaminant.

There are fluid handling systems known in the art. U.S. Pat. No. 2,792,920 issued to R. M. Sutphen discloses a fluid dispensing vending device. Sutphen's device is a coin-activated electro-magnetically and electro-mechanically operated beverage dispenser. Sutphen's device dispenses fluid from a reservoir. During operation, fluid is discharged, first, into a measuring device and then into a consumer's beverage receptacle. Flow of fluid between the primary reservoir and the measuring device is controlled by upper and lower valve members carried by a single valve rod. As a result, during the actuation of the valve rod, there is a moment in which both valves are open. As a result the primary chamber, or reservoir is temporarily not isolated from the outlet tube.

Further, U.S. Pat. No. 5,425,404 issued to Dyer on Jun. 20, 1995, discloses a gravity feed fluid dispensing system. And, U.S. Pat. No. 5,560,405 issued to Harris, et al. on Oct. 1, 1996, discloses a flow control system and method.

What is missing from the art is a coin-operated fluid dispensing device, for dispensing a fluid such as windshield cleaning fluid, that is crank operated and that has a primary reservoir, a measuring reservoir and a dispensing house and valves that are configured such that the primary reservoir can be isolated from the dispensing hose at all times.

Accordingly, it is an object of the present invention to provide a windshield cleaning fluid dispenser that is coin operated. A further object of the present invention is to provide such a coin operated windshield cleaning fluid dispenser that has a primary reservoir and a measuring reservoir such that fluid is dispensed to the consumer from the measuring reservoir through a dispensing tube, in which fluid flow between the primary reservoir and the measuring reservoir is controlled by first and second valves that are operated such that the primary reservoir is always isolated from the dispensing tube.

Other objects and advantages over the prior art will become apparent to those skilled in the art upon reading the detailed description together with the drawings as described as follows.

DISCLOSURE OF THE INVENTION

In accordance with the various features of this invention, a windshield cleaning fluid dispenser that is coin operated is provided. The preferred embodiment of the present windshield cleaning fluid dispenser includes a primary reservoir in which the windshield cleaning fluid is stored pending dispensing. A measuring reservoir is in fluid communication with the primary reservoir and is of a selected volume. A dispensing tube, for dispensing the windshield cleaning fluid into the consumer's vehicle, is in fluid communication with the measuring reservoir. Fluid flow between the primary reservoir and the measuring reservoir is controlled by a crank actuated poppet valve. The poppet valve is spring biased into the closed position. A second crank actuated poppet valve is used to control fluid flow between the measuring reservoir and the dispensing tube. In the preferred embodiment, these two poppet valves are 180° opposed with the crank disposed approximately midway between them. The second poppet valve is also spring biased into the closed position. The first and second valves and associated springs are supported by first and second support assemblies.

The crank has a substantially cylindrical cross section and a pair of substantially non-stretchable tethers is secured to the crank at a selected point. The distal end of the first tether is secured to the first poppet valve and the distal end of the second tether is secured to the second poppet valve. The crank is movable in a first selected direction from a starting position to an actuation position. Movement in the opposite direction returns the crank to the starting position. The length of each tether is selected such that the tethers are extended, but not under tension when the crank is midway between the starting and actuation positions. When the crank is in the starting position, the tether to the first poppet valve is not engaged by the surface of the crank and is relaxed and the first spring biases the poppet valve into the closed position, isolating the primary reservoir from the measuring reservoir. However, the second tether is engaged by the crank and is held under tension opening the second poppet valve and exposing the measuring reservoir to the dispensing tube. As the crank is moved from the starting position to the actuation position, the second poppet valve closes as the crank passes the midway point, isolating the measuring reservoir from the dispensing tube. Upon further movement of the crank towards the actuation position, the first tether engages the crank and is held under tension, thus opening the first poppet valve and exposing the primary reservoir to the measuring reservoir. Fluid flows, under the pressure of gravity, from the primary reservoir into the measuring reservoir to the capacity of the measuring reservoir. After the measuring reservoir is filled to capacity, the crank is returned to the starting position. As stated above, in the starting position, the first poppet valve is closed at the midway point and the second poppet valve is opened as the crank moves from the midway position to the starting position. Upon opening of the second poppet valve, exposing the measuring reservoir to the dispensing tube, fluid is drained from the measuring reservoir into the dispensing tube to be dispensed to the customer. It will be recognized that since both poppet valves are closed at the midway point, the primary reservoir is at all times isolated from the dispensing tube. Further, in the preferred embodiment, a pair of vent tubes are provided to vent the primary and measuring reservoirs during the flow of fluid. A valve is located within the vent tube associated with the measuring reservoir to prevent fluid from rising in the vent tube, thus ensuring that the amount of fluid that flows into the measuring reservoir is consistent regardless of the level of fluid within the primary reservoir.

In the preferred embodiment, the fluid dispensing device is coin-operated. In this regard, a state of the art coin mechanism is adapted so as to be carried by the device. The handle of the coin mechanism is modified to carry a gear. A gear is also provided on the external extension of the crank and a belt is provided to transfer rotational movement from the handle to the crank. As those skilled in the art will recognize, the handle of the coin mechanism is locked and is not free to rotate absent the correct number and type of coins being placed in the coin mechanism. In this manner, the crank is locked, thus preventing unpaid dispensing of windshield cleaning fluid. In one embodiment, the user rotates the handle of the mechanism. In the preferred embodiment, a lever arm is disposed on the end of the crank for assisting in operation of the crank. Additionally, in the preferred embodiment, a helical spring is disposed around the crank to bias the crank to the starting position.

BRIEF DESCRIPTION OF THE DRAWINGS

FIG. 1 illustrates a side elevation, in partial cross-section, of the preferred embodiment of the coin-operated windshield cleaning fluid dispenser of the present invention. FIG. 1 shows the crank in the starting position with the primary reservoir isolated from the measuring reservoir.

BEST MODE FOR CARRYING OUT THE INVENTION

Figure 5:
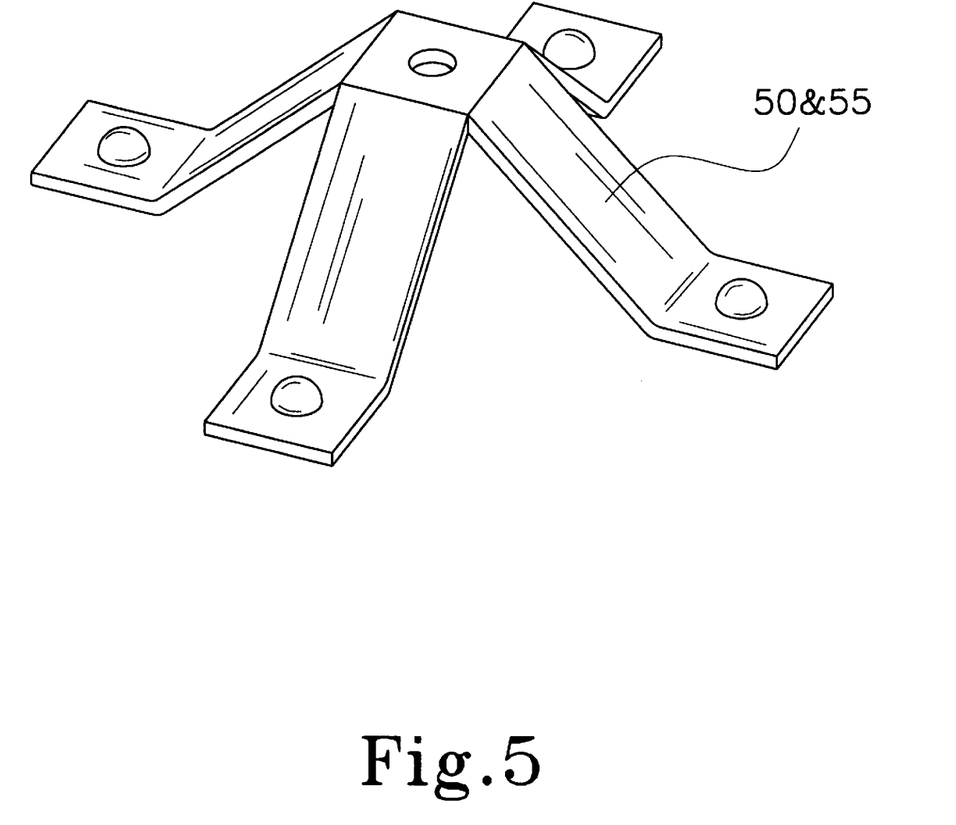
FIG. 5 shows a perspective view of the valve and spring support.
Figure 6:
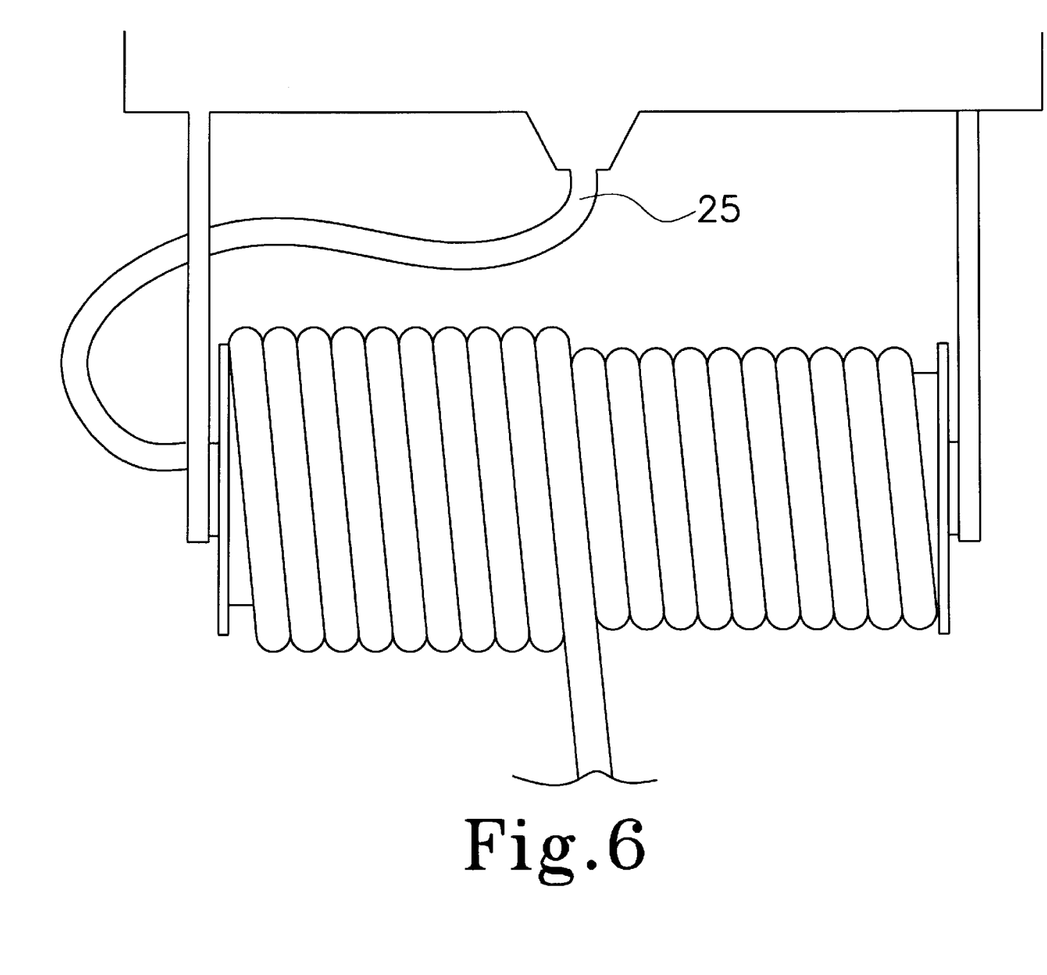
FIG. 6 shows an elevational view of one embodiment of a take-up reel for the dispensing tube.

A windshield cleaning fluid dispenser constructed in accordance with the present invention, is illustrated generally as 10 in the figures. The windshield cleaning fluid dispenser 10 of the present includes a primary reservoir 15 in which the windshield cleaning fluid 18 is stored pending dispensing. A measuring reservoir 20 is in fluid communication with the primary reservoir 15 and is of a selected volume. In this regard, the windshield cleaning fluid dispenser 10 is used to dispense a selected volume of windshield cleaning fluid to a customer. The volume of measuring reservoir 20 is selected to correspond to the amount of fluid desired to be dispensed. A dispensing tube 25, for dispensing the windshield cleaning fluid 18 into the consumer's vehicle (not shown), is in fluid communication with the measuring reservoir 20. The dispensing tube 25 can be adapted with a nozzle 27 to assist the consumer in directed windshield cleaning fluid 18 into the appropriate receptacle (not shown) in the consumer's vehicle. The flow of windshield cleaning fluid 18 between the primary reservoir 15 and the measuring reservoir 20 is controlled by a first poppet valve 30. A spring 35 biases first poppet valve 30 into the closed position, illustrated in FIG. 1. A second poppet valve 40 is used to control fluid flow between the measuring reservoir 20 and the dispensing tube 25. Second poppet valve 40 is also biased into a closed position by a spring 45. The first valve 30 and first spring 35 are supported by a first support assembly 50 such as illustrated in FIG. 5. The second valve 40 and second spring 45 are supported by a second support assembly 55. First and second support assemblies 50 and 55 are preferably secured to the interior of measuring reservoir 20. In the preferred embodiment, first and second poppet valves 30 and 40 are 180° opposed and have a crank 60 disposed approximately midway between them. Crank 60 has a distal end 62 that extends through a fluid tight sealed opening 64 through a back wall portion 66 of the measuring reservoir and is supported by bearing 68. The proximal end 70 of crank 60 extends through a second fluid tight sealed opening 72 in the front wall portion 74.

Figure 1:
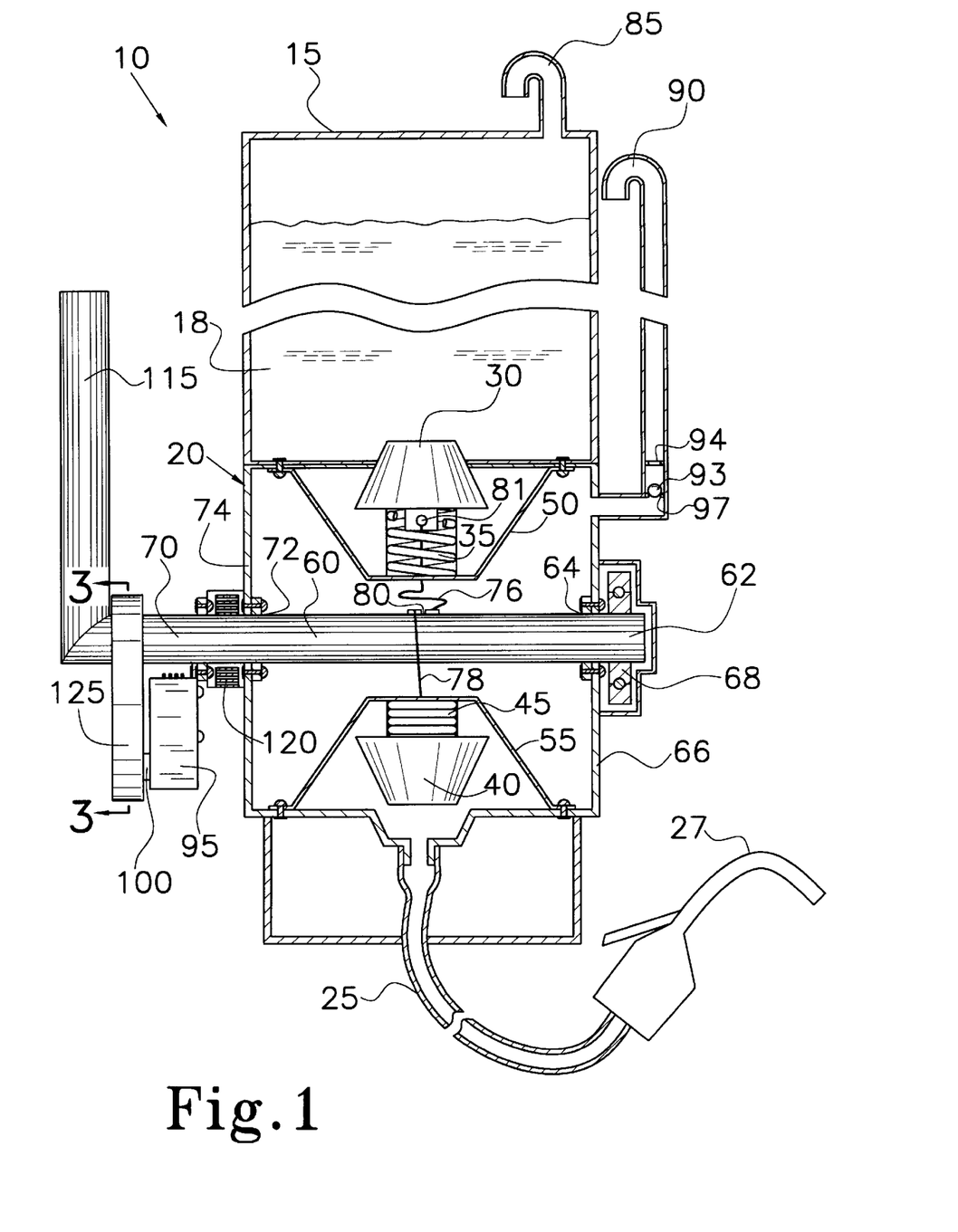
Figure 1A:
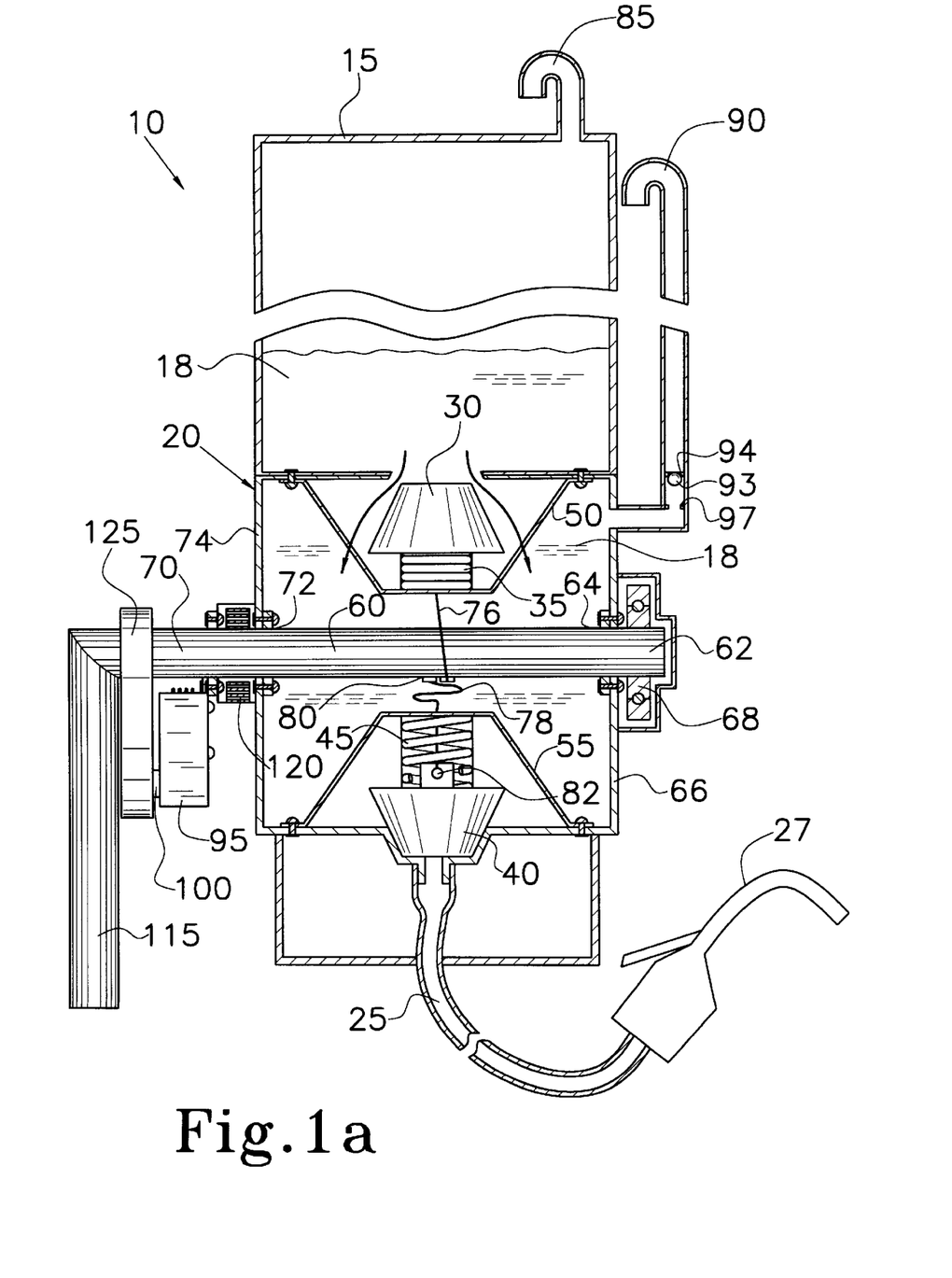
FIG. 1a illustrates a side elevation, in partial cross-section, of the device shown in FIG. 1 showing the crank in the actuation position with fluid flowing from the primary reservoir into the measuring reservoir.
Figure 1B:
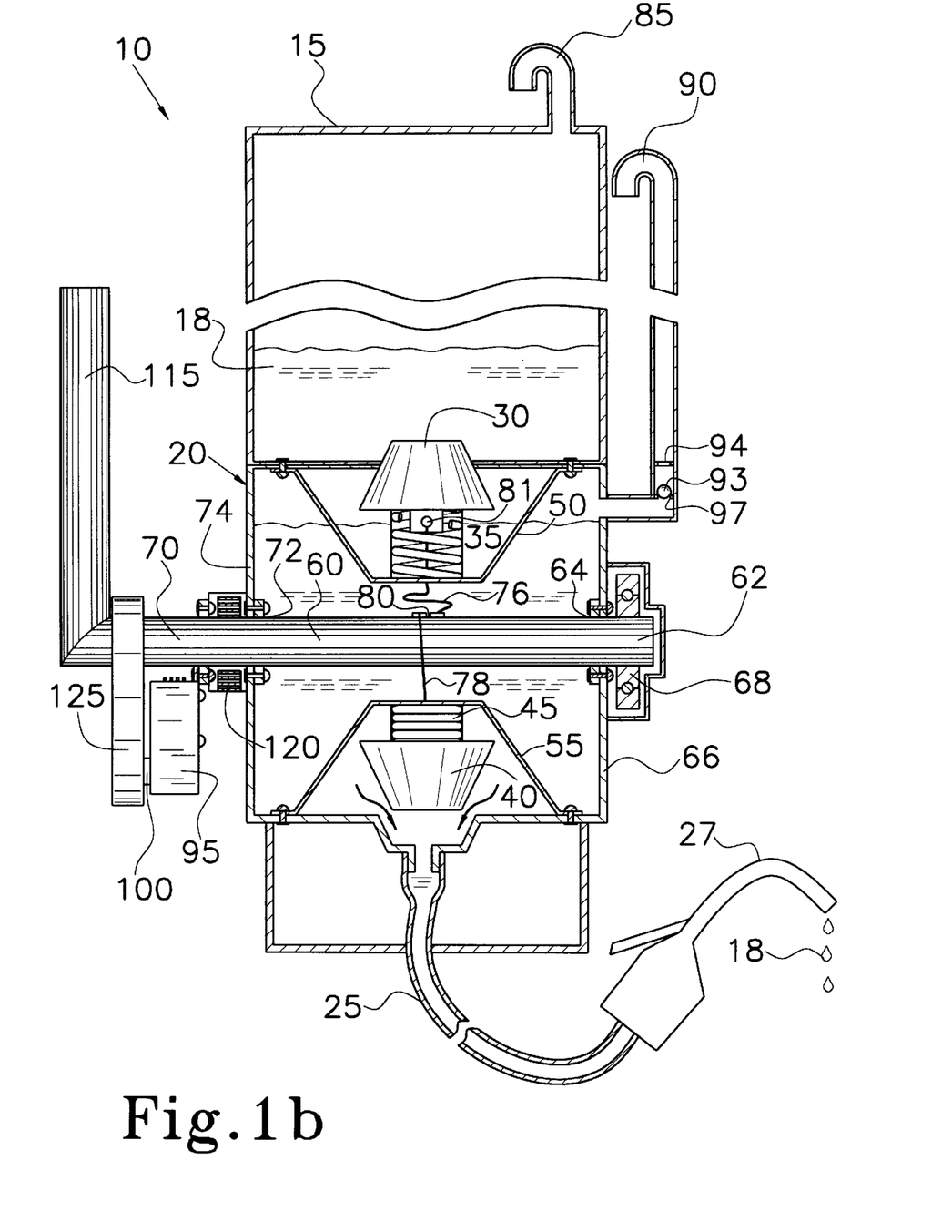
FIG. 1b illustrates a side elevation, in partial cross-section, of the device shown in FIG. 1 showing the crank returned to the starting position with fluid draining from the measuring reservoir into the dispensing tube.
Figure 1C:
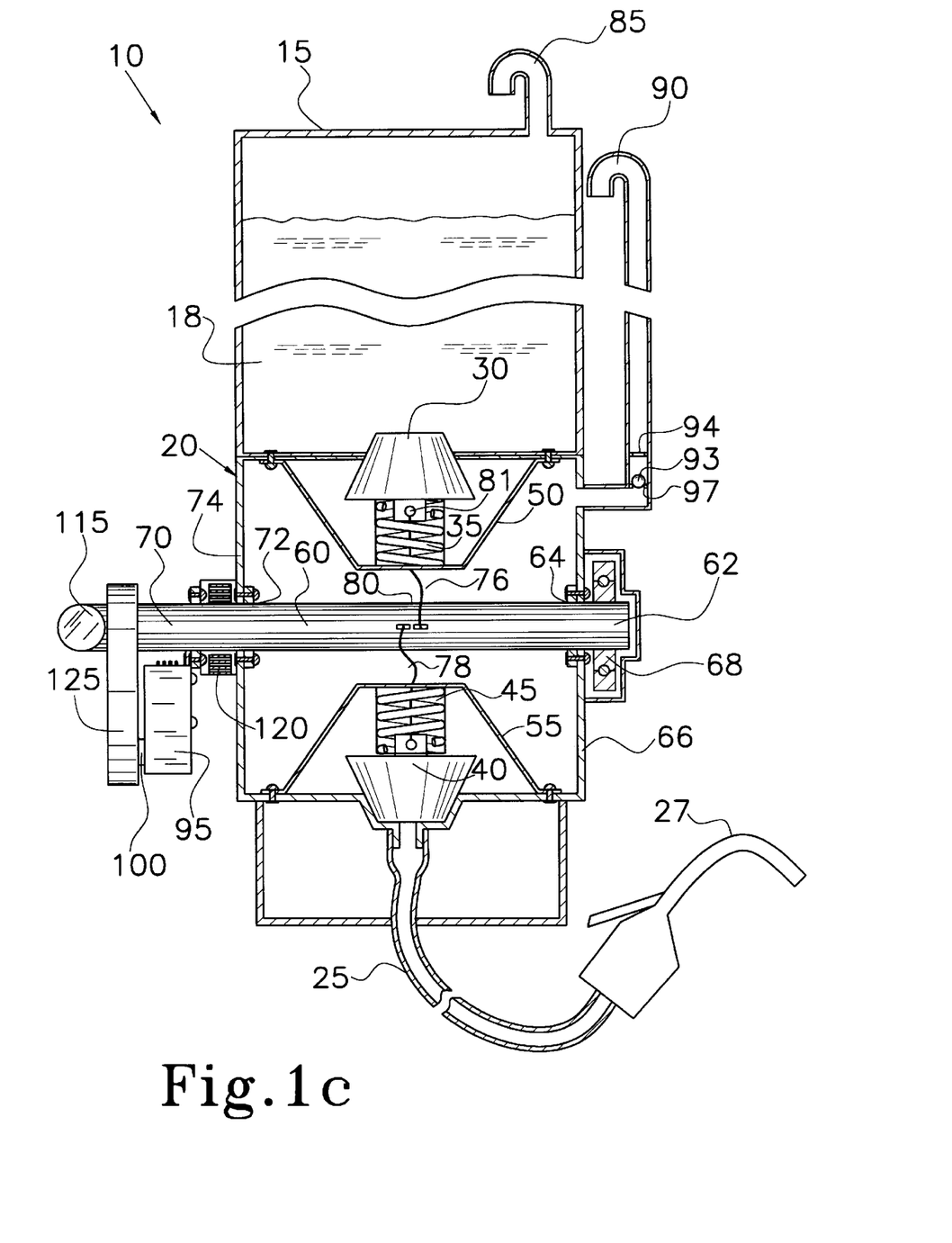
FIG. 1c illustrates a side elevation, in partial cross-section, of the device shown in FIG. 1 showing the crank midway between the starting position and the actuation position showing both poppet valves closed.

The crank 60 has a substantially cylindrical cross section and a first and a second substantially non-stretchable tether 76 and 78, respectively, are secured to the crank 60 at a selected point 80 on its circumference. The distal end 81 of the first tether 76 is secured to the first poppet valve 30 and the distal end 82 of the second tether 78 is secured to the second poppet valve 40. The crank 60 is movable in a first selected direction from a starting position to an actuation position. FIG. 1 illustrates the preferred embodiment of the starting position and FIG. 1a illustrates the preferred embodiment of the actuation position. In the preferred embodiment, the actuation position is 180° removed from the starting position. However, the starting position can be removed from a vertical attitude by any number of degrees and can be separated from the actuation position by any number of degrees. Movement in the opposite direction returns the crank to the starting position. As illustrated in FIG. 1c, the length of first and second tethers 76 and 78 is selected such that the tethers are extended, but not under tension when the crank 60 is midway between the starting and actuation positions. Referring to FIG. 1, 1a, 1b and 1c, when the crank 60 is in the starting position, the tether 76 to the first poppet valve 30 is not engaged by the surface of the crank and is relaxed and the first spring 35 biases the first poppet valve 30 into the closed position, isolating the primary reservoir 15 from the measuring reservoir 20. However, the second tether 78 is engaged by the surface of the crank 60 and is held under tension, thus opening the second poppet valve 40 against the tension of the compressed spring 45 and exposing the measuring reservoir to the dispensing tube 25. As the crank 60 is moved from the starting position to the actuation position, the second poppet valve 40 closes as the crank passes through the midway point, isolating the measuring reservoir 20 from the dispensing tube 25. Upon further movement of the crank 60 towards the actuation position, seen in FIG. 1a, the first tether 76 engages the surface of the crank 60 and is held under tension, thus opening the first poppet valve 30 against the tension of the compressed spring 35, and exposing the primary reservoir 15 to the measuring reservoir 20. Fluid 18 flows, under the pressure of gravity, from the primary reservoir 15 into the measuring reservoir 20 to the capacity of the measuring reservoir 20. After the measuring reservoir 20 is filled to capacity, the crank 60 is returned to the starting position. As stated above, in the starting position, the first poppet valve 30 is closed as the crank 60 passes through the midway point and the second poppet valve 40 is opened as the crank 60 moves from the midway position to the starting position. Upon opening of the second poppet valve 40, exposing the measuring reservoir 20 to the dispensing tube 25, fluid 18 is drained from the measuring reservoir 20 into the dispensing tube 25 to be dispensed to the customer. It will be recognized that since the first and second poppet valves 30 and 40 are each closed at the midway point, the primary reservoir 15 is at all times isolated from the dispensing tube 25.

In the preferred embodiment, a pair of vent tubes 85 and 90 are provided to vent the primary and measuring reservoirs 15 and 20, respectively, during the flow of fluid 18. Those skilled in the art will appreciate that as fluid 18 flows into measuring reservoir 20, if unrestrained it will rise in vent tube 90 to a level equal to the level of fluid 18 remaining in the primary reservoir 15, thus resulting in inconsistency in the amount of fluid 18 dispensed. Accordingly a one-way valve 92 is disposed within the vent tube to limit the amount of fluid 18 that is allowed to flow into vent tube 90. In the preferred embodiment, one-way valve 92 comprises a floatable ball member 93 sized so as to allow air to travel in vent tube 90 around ball member 93, and a seal member 94 against which ball member 93 seats when fluid pushes the ball member 93 against the seal member 94. Thus, as fluid 18 rises in vent tube 90, the ball member 93 floats upward and seats against seal member 94 thus sealing the vent tube and preventing fluid 18 from rising further in vent tube 90. As the fluid 18 drains out of the measuring reservoir 20, the ball member 93 falls downward against tabs 97, unsealing the vent tube 90. Also, while a specific embodiment for a valve actuator has been described, it will be appreciated that other actuators could be utilized.

Figure 2:
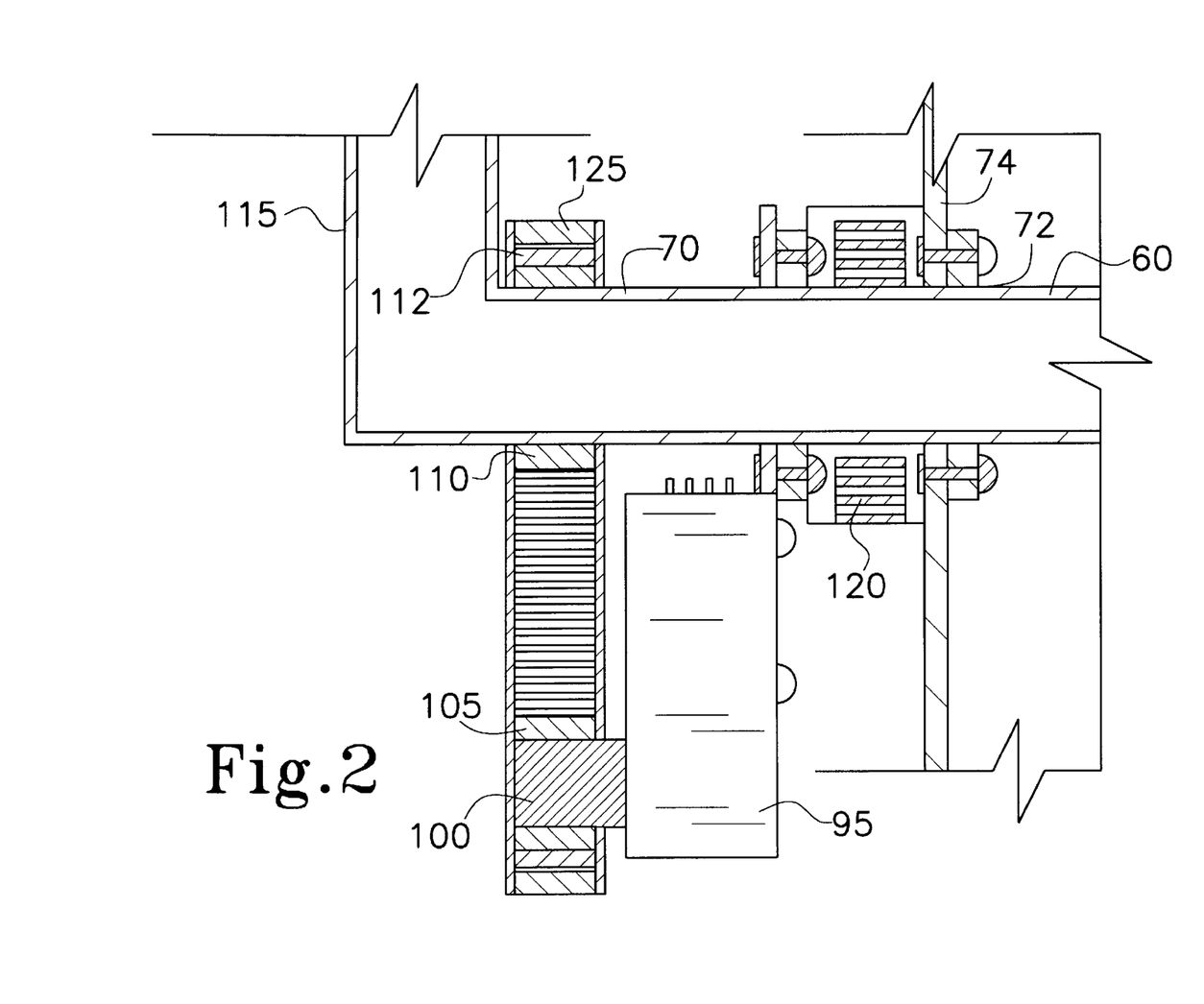
FIG. 2 shows an enlarged side elevation, in partial cross-section, showing the coin mechanism's geared handle, the belt and the gear on the crank.
Figure 3:
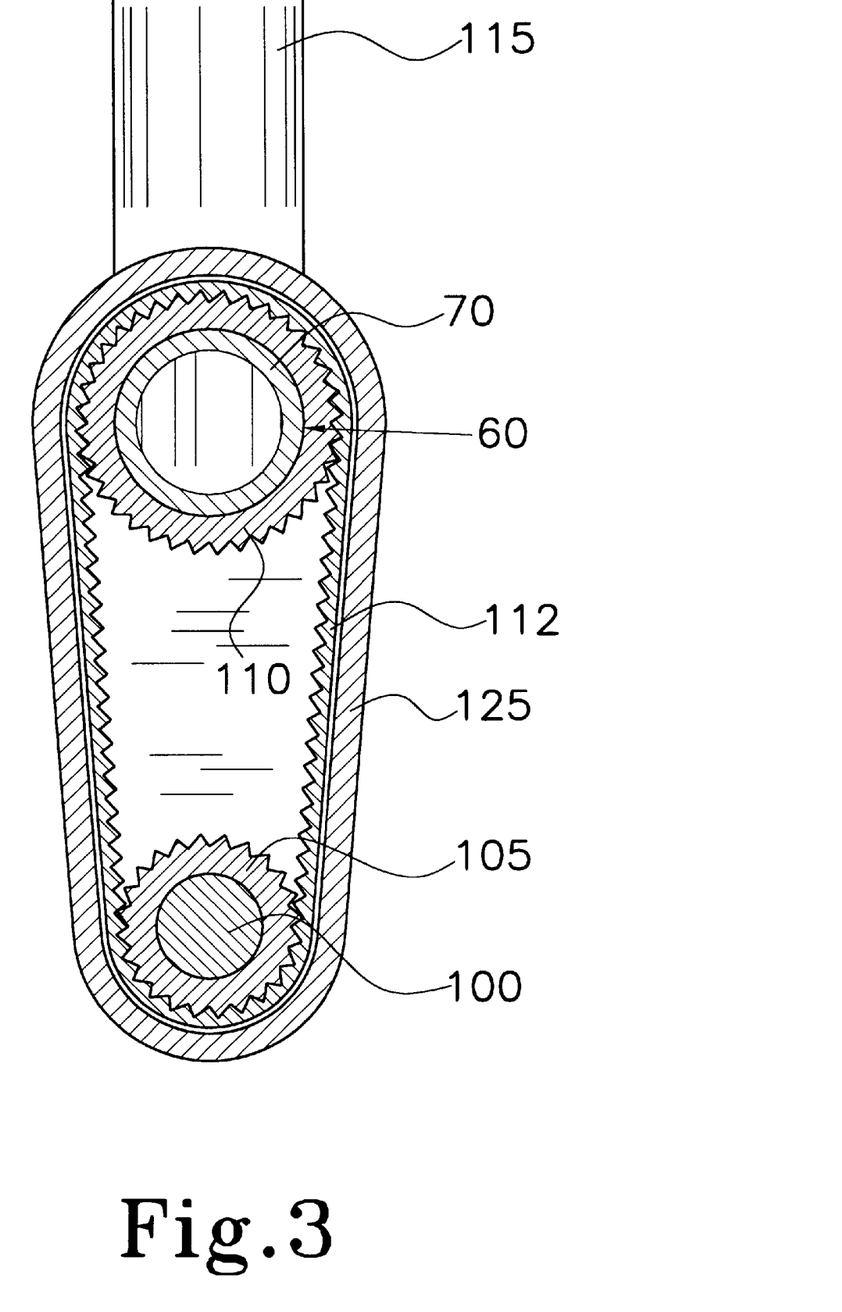
FIG. 3 shows a cross-sectional view taken along line 3—3 in FIG. 1 of the geared handle, belt and the gear on the crank.
Figure 4:
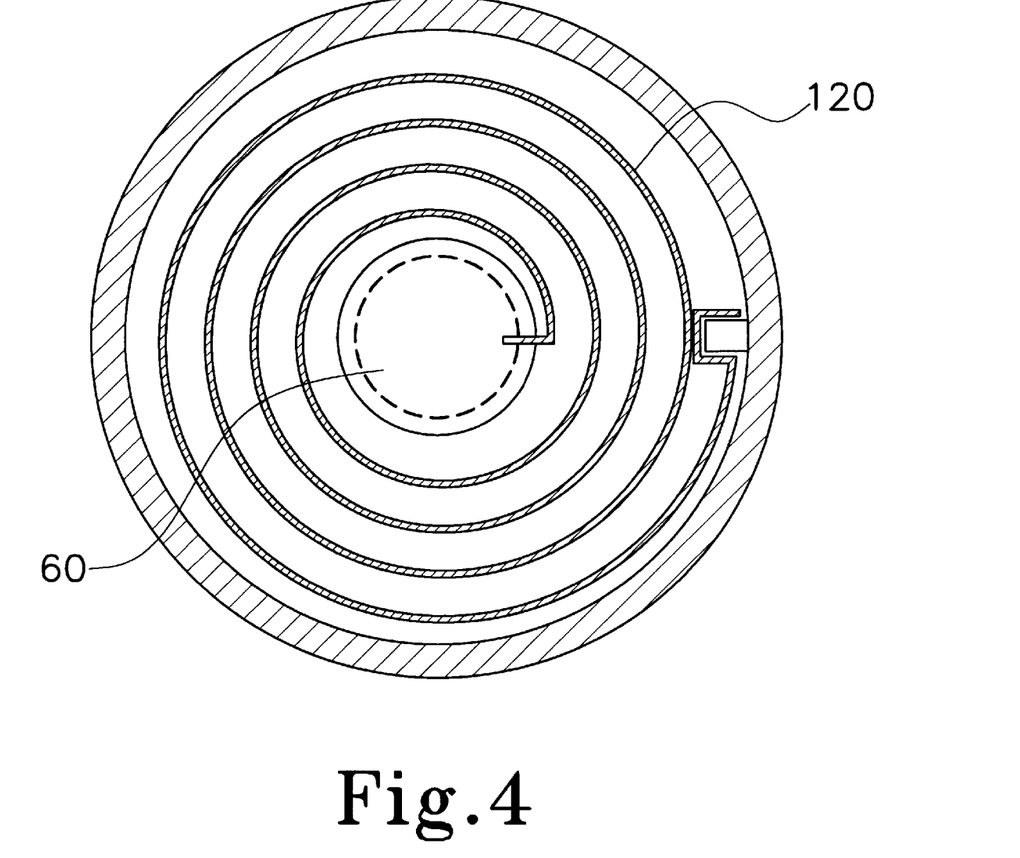
FIG. 4 shows and end view of the helical spring for biasing the crank in the starting position.

In the preferred embodiment, the windshield cleaning fluid dispensing device 10 is coin-operated. In this regard, a state of the art coin mechanism 95, such as model no. MK0044 provided by Nova Industries of Idaho Falls, Id., is adapted so as to be carried by the device. The handle 100 of the coin mechanism 95 is modified to carry a gear 105. A second gear 110 is provided on the proximal end 70 of the crank and a belt 112 is provided to transfer rotational movement from the handle 100 to the crank 60. As those skilled in the art will recognize, the handle 100 of the coin mechanism 95 is locked and is not free to rotate absent the correct number and type of coins (not shown) being placed in the coin mechanism 95. In this manner, the crank 60 is locked, thus preventing unpaid dispensing of windshield cleaning fluid 18. In one embodiment, the user rotates the handle 100 of the coin mechanism 95. In the preferred embodiment, a lever arm 115 is disposed on the proximal end 70 of the crank 60 for assisting in operation of the crank 60. Additionally, in the preferred embodiment, a helical spring 120 is disposed around the crank 60 to bias the crank 60 to the starting position. Further, in the preferred embodiment, a housing 125 is provided to protect gears 105 and 110 and belt 112.

From the foregoing description, it will be recognized by those skilled in the art that a windshield cleaning fluid dispenser that is coin operated offering advantages over the prior art has been provided. Specifically, the coin operated windshield cleaning fluid dispenser of the present invention provides a coin operated windshield cleaning fluid dispenser that has a primary reservoir and a measuring reservoir configured such that fluid is dispensed to the consumer from the measuring reservoir through a dispensing tube, in which fluid flow between the primary reservoir and the measuring reservoir is controlled by first and second valves that are operated such that the primary reservoir is always isolated from the dispensing tube.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A coin-operated fluid dispenser for dispensing a measured volume of fluid, said fluid dispenser comprising:

a primary reservoir for receiving and storing a quantity of fluid;

a measuring reservoir having a selected volume in fluid communication with said primary reservoir;

a dispensing tube for dispensing said quantity of fluid to a consumer, said dispensing tube being in fluid communication with said measuring reservoir;

a valve assembly for controlling fluid flow between said primary reservoir and said measuring reservoir and for controlling fluid flow between said measuring reservoir and said dispensing tube, said valve assembly including a first valve for blocking fluid flow between said primary reservoir and said measuring reservoir and a second valve for blocking fluid flow between said measuring reservoir and said dispensing tube, and an actuator for independently actuating said first valve and said second valve such that said primary reservoir is continuously isolated from said dispensing tube; and a coin mechanism carried by said fluid dispensing device for receiving coins and for controlling actuation of said actuator.

2. The fluid dispensing device of claim 1 wherein said fluid is windshield cleaning fluid.

3. The fluid dispensing device of claim 1 wherein said first valve and said second valve each define poppet valves, said second valve being 180° opposed from said first valve.

4. The fluid dispensing device of claim 3 wherein said actuator is defined by a crank and said fluid dispensing device further comprises a first tether and a second tether secured to said crank at a selected location on a circumference of said crank, said first tether having a distal end secured to said first poppet valve and said second tether having a distal end secured to said second poppet valve.

5. The fluid dispensing device of claim 4 wherein said coin mechanism includes a handle having a first gear and wherein a second gear is provided on a proximal end of said crank, said fluid dispensing device further comprising a belt engaged with said first gear and said second gear for transferring rotation movement from said handle to said crank.

6. A coin-operated fluid dispenser for dispensing a measured volume of fluid, said fluid dispenser comprising:

a primary reservoir for receiving and storing a quantity of fluid;

a measuring reservoir having a selected volume in fluid communication with said primary reservoir;

a dispensing tube for dispensing said quantity of fluid to a consumer, said dispensing tube being in fluid communication with said measuring reservoir;

a valve assembly for controlling fluid flow between said primary reservoir and said measuring reservoir and for controlling fluid flow between said measuring reservoir and said dispensing tube, said valve assembly including a first valve for blocking fluid flow between said primary reservoir and said measuring reservoir and a second valve for blocking fluid flow between said measuring reservoir and said dispensing tube, and a crank for independently actuating said first valve and said second valve such that said primary reservoir is continuously isolated from said dispensing tube; and a coin mechanism carried by said fluid dispensing device for receiving coins and for controlling actuation of said actuator.

7. The fluid dispensing device of claim 6 wherein said fluid is windshield cleaning fluid.

8. The fluid dispensing device of claim 6 wherein said first valve and said second valve each define poppet valves, said second valve being 180° opposed from said first valve.

9. The fluid dispensing device of claim 8 wherein said fluid dispensing device further comprises a first tether and a second tether secured to said crank at a selected location on a circumference of said crank, said first tether having a distal end secured to said first poppet valve and said second tether having a distal end secured to said second poppet valve.

10. The fluid dispensing device of claim 9 wherein said coin mechanism includes a handle having a first gear and wherein a second gear is provided on a proximal end of said crank, said fluid dispensing device further comprising a belt engaged with said first gear and said second gear for transferring rotation movement from said handle to said crank.

11. A coin-operated fluid dispenser for dispensing a measured volume of fluid, said fluid dispenser comprising:

a primary reservoir for receiving and storing a quantity of fluid;

a measuring reservoir having a selected volume in fluid communication with said primary reservoir;

a dispensing tube for dispensing said quantity of fluid to a consumer, said dispensing tube being in fluid communication with said measuring reservoir;

a valve assembly for controlling fluid flow between said primary reservoir and said measuring reservoir and for controlling fluid flow between said measuring reservoir and said dispensing tube, said valve assembly including a first poppet valve for blocking fluid flow between said primary reservoir and said measuring reservoir and a second poppet valve for blocking fluid flow between said measuring reservoir and said dispensing tube, said second valve being 180° opposed from said first valve, a crank for independently actuating said first valve and said second valve such that said primary reservoir is continuously isolated from said dispensing tube, a first tether and a second tether secured to said crank at a selected location on a circumference of said crank, said first tether having a distal end secured to said first poppet valve and said second tether having a distal end secured to said second poppet valve; and a coin mechanism carried by said fluid dispensing device for receiving coins and for controlling actuation of said actuator.

12. The fluid dispensing device of claim 11 wherein said fluid is windshield cleaning fluid.

13. The fluid dispensing device of claim 11 wherein said coin mechanism includes a handle having a first gear and wherein a second gear is provided on a proximal end of said crank, said fluid dispensing device further comprising a belt engaged with said first gear and said second gear for transferring rotation movement from said handle to said crank.

* * * * *